United States Patent
Shadrin et al.

(10) Patent No.: US 10,938,789 B2
(45) Date of Patent: Mar. 2, 2021

(54) SYSTEM AND METHOD FOR TRUSTED PRESENTATION OF INFORMATION ON UNTRUSTED USER DEVICES

(71) Applicant: AO Kaspersky Lab, Moscow (RU)

(72) Inventors: Alexander V. Shadrin, Moscow (RU); Dmitry A. Kulagin, Moscow (RU); Pavel V. Dyakin, Moscow (RU)

(73) Assignee: AO Kaspersky Lab, Moscow (RU)

( * ) Notice: Subject to any disclaimer, the term of this patent is extended or adjusted under 35 U.S.C. 154(b) by 192 days.

(21) Appl. No.: 15/493,520

(22) Filed: Apr. 21, 2017

(65) Prior Publication Data
US 2018/0167674 A1    Jun. 14, 2018

(30) Foreign Application Priority Data
Dec. 12, 2016 (RU) .......................... RU2016148490

(51) Int. Cl.
| H04L 29/06 | (2006.01) |
| G06F 21/84 | (2013.01) |
| G06F 21/16 | (2013.01) |
| G06F 21/62 | (2013.01) |

(52) U.S. Cl.
CPC .......... *H04L 63/0428* (2013.01); *G06F 21/16* (2013.01); *G06F 21/6281* (2013.01); *G06F 21/84* (2013.01)

(58) Field of Classification Search
CPC . H04L 63/0428; G06F 21/16; G06F 21/6281; G06F 21/84
USPC .......................................................... 726/25
See application file for complete search history.

(56) References Cited

U.S. PATENT DOCUMENTS

| 7,380,130 B2 | 5/2008 | England et al. |
| 7,406,603 B1* | 7/2008 | MacKay ................. G06F 21/10 713/193 |
| 8,572,403 B2 | 10/2013 | Beaumont et al. |
| 2002/0023216 A1 | 2/2002 | Noguchi et al. |
| 2003/0014632 A1 | 1/2003 | Vanstone |
| 2008/0228821 A1* | 9/2008 | Mick ....................... G06F 21/10 |
| 2009/0049301 A1 | 2/2009 | Hamid |
| 2009/0063986 A1 | 3/2009 | Camenisch et al. |

(Continued)

FOREIGN PATENT DOCUMENTS

| JP | 2015534658 A | 12/2015 |
| RU | 2292122 C1 | 1/2007 |

(Continued)

*Primary Examiner* — Samson B Lemma
*Assistant Examiner* — Zoha Piyagehghibi Tafaghodi
(74) *Attorney, Agent, or Firm* — Arent Fox LLP; Michael Fainberg

(57) ABSTRACT

Disclosed are systems and method for trusted presentation of information on an untrusted user device. An exemplary system includes a secure portable device which can be connected to the untrusted user device and configured to: receive data from the untrusted user device; analyze the received data to identify therein information intended for display to the user via the untrusted user device; generate a video stream containing at least part of the information intended for display to the user; generate and insert into the video stream one or more protection elements that serve to authenticate the information being outputted in the video stream; and transmit the generated video stream to the user device.

18 Claims, 5 Drawing Sheets

(56) References Cited

U.S. PATENT DOCUMENTS

| | | | |
|---|---|---|---|
| 2009/0132808 A1 | 5/2009 | Baentsch et al. | |
| 2009/0235081 A1 | 9/2009 | Hamid | |
| 2011/0258657 A1* | 10/2011 | Casilao | G06Q 50/10 |
| | | | 725/31 |
| 2013/0086380 A1* | 4/2013 | Krishnaswamy | H04L 63/08 |
| | | | 713/168 |
| 2013/0290697 A1* | 10/2013 | Wang | H04L 63/0428 |
| | | | 713/150 |
| 2013/0318589 A1* | 11/2013 | Ford | H04L 63/08 |
| | | | 726/7 |
| 2014/0075198 A1* | 3/2014 | Peirce | H04L 63/0478 |
| | | | 713/176 |
| 2014/0366159 A1* | 12/2014 | Cohen | G06F 21/31 |
| | | | 726/28 |
| 2015/0143118 A1* | 5/2015 | Sheller | H04L 63/0428 |
| | | | 713/168 |
| 2015/0373032 A1* | 12/2015 | Stevens | H04L 63/14 |
| | | | 713/176 |
| 2016/0253772 A1* | 9/2016 | Kofod | G06F 21/16 |
| | | | 382/100 |
| 2016/0301702 A1* | 10/2016 | Suominen | G06F 21/64 |
| 2017/0164201 A1 | 6/2017 | Li et al. | |

FOREIGN PATENT DOCUMENTS

| | | |
|---|---|---|
| RU | 2494455 C2 | 9/2013 |
| RU | 2591655 C1 | 7/2016 |

\* cited by examiner

SYSTEM AND METHOD FOR TRUSTED PRESENTATION OF INFORMATION ON UNTRUSTED USER DEVICES

CROSS-REFERENCE TO RELATED APPLICATIONS

This application claims benefit of priority under 35 U.S.C. 119(a)-(d) to a Russian Application No. 2016148490 filed on Dec. 12, 2016, which is incorporated by reference herein.

FIELD OF TECHNOLOGY

The disclosure relates generally to the field of cybersecurity, and more specifically to systems and method for trusted presentation of information on untrusted user devices.

BACKGROUND

Computer security has become an indispensable part of modern information (computer) technologies, especially with regard to banking operations, the transmittal of confidential data, especially personal data, and interactions with corporate networks.

At the same time, the overwhelming majority of users employ standard computing devices (e.g., desktop computer, notebook, smartphone, etc.), which often cannot assure the necessary level of protection when working with information requiring confidentiality. These devices can be compromised by hackers, and subject to targeted attacks, during which both access to the data on the device and control over it is obtained by unauthorized third-parties. Meanwhile, such devices are often important to the work of the user, who finds it difficult if not impossible to forego their use or replace them with some other type of device, one which is more secure. The user can not only foregoes the use of the computing devices (hardware) themselves, but also in most cases the software (applications) installed on them as well.

One of the possible solutions to the problem of providing the necessary level of protection when working with information requiring confidentiality on devices is to use a compact secure external device which interacts with the user's devices. Such a device will perform operations (computations) inside itself, and since these operations will not be accessible from the user's device, which may be compromised, the operations will be secure. As an example of such a device one can mention the USB eToken (a protected electronic key). eToken is widely used for purposes of authentication, the generation of cryptographic keys, and other tasks related to information security. A characteristic of such a device is the fact that the device performs computations which cannot be accessed from the user's computing device, i.e., from a device on which actions requiring protection are being carried out.

However, as noted at the outset, the user's computing devices (e.g., a computer) are themselves subject to various attacks during which harmful software is installed on the computer. After this, the harmful software can become an intermediary between the device (eToken) and the application which is performing confidential actions (such as signing a document or performing a banking transaction), and can intercept and alter various data (such as messages, passwords, keys). This method is also called a man-in-the-middle attack, during which harmful software becomes an intermediary (another link in the chain) between the device and another application. Furthermore, in such a method the hacker need only intercept the data being transmitted and substitute it, which is entirely realistic. In this case, the computer is compromised, it becomes untrusted from the standpoint of security, and it contains an untrusted computing environment in which the user is working. Consequently, when working with important information such as confidential documents, accessing and interacting within a corporate network from personal computing devices or performing an electronic confirmation of documents (electronic key) or banking operations via a web banking site, such information might be intercepted, altered, replaced, and as a result leads to the user making an incorrect decision or performing falsified actions.

Thus, for example, in a banking operation a request can be made to authorize a certain transaction. The user in this case expects to receive a request to authorize a particular sum. If harmful software is present on the computer of the user, the harmful software makes a request to authorize a different transaction, for example one with a much larger sum. After this, the message as to the authorization of the transaction is distorted, the user is shown on screen the sum which he is expecting, while in reality a transaction for a much larger sum is being authorized. Based on the information received in the message and/or presented on the computer screen, the user authorizes the given transaction (or both of them) and loses money.

In another example, the user needs to verify a confidential document (contract), but if the computer has been compromised the user will also be shown on screen either different information affecting the decision to confirm the document or real information, but in this case a different document will be signed (confirmed).

Therefore, one drawback to the above presented approach (the USB eToken device) is that the user has no guarantee that the trusted device, such as USB eToken, is in fact working (displaying, signing, etc.) with genuine information, or that the user is in fact being presented with genuine information, if the user's computer is compromised and/or is an untrusted device. In other words, a mechanism is needed which allows the necessary information to be presented to the user and/or to guarantee its authenticity on an untrusted computing device.

SUMMARY

Disclosed are systems and method for trusted presentation of information on untrusted user devices. In general, the disclosed systems and methods provide protection against replacement of electronic documents on computing devices. They makes it possible to present information to a user in unaltered form on an untrusted computing device, regardless of whether the computing device is s personal or public computing device. One technical result of the present invention is to restrict and diminish the possibility of replacing information being displayed on the computer screen by virtue of a correlation (e.g., linking) of said information with information as reported on an external secure portable device in real time.

In one exemplary aspect, a method for trusted presentation of information on an untrusted user device comprises: connecting a secure portable device to the untrusted user device; receiving, by the secure portable device, data from the untrusted user device; analyzing, by the secure portable device, the received data to identify therein information intended for display to the user via the untrusted user device; generating, by the secure portable device, a video stream containing at least part of the information intended for display to the user; generating and inserting into the video stream one or more protection elements that serve to authenticate the information being outputted in the video stream; and transmitting the generated video stream by the untrusted user device to the user device.

In one exemplary aspect, the method further comprises: synchronizing the display of the protection elements on a display of the user device and on a user interface of the secure portable device.

In one exemplary aspect, analyzing the received data includes one or more of: determining whether the data is encrypted and decrypting it; checking authenticity of the received data; determining the information contained in the received data and its parameters; and identifying within analyzed data information intended to be displayed to the user.

In one exemplary aspect, wherein the protection element includes one of: a background, a watermarks, an animation, and change of font and position of words or letters.

In one exemplary aspect, the protection elements are generated and selected randomly.

In one exemplary aspect, the method further comprises periodically changing the protection elements inserted in the video stream.

In one exemplary aspect, one or more protection elements are generated based on the user input via the user interface of the secure portable device.

In another exemplary aspect, a system for trusted presentation of information on an untrusted user device comprises: a secure portable device having at least one processor configured to: receive data from the untrusted user device; analyze the received data to identify therein information intended for display to the user via the untrusted user device; generate a video stream containing at least part of the information intended for display to the user; enerate and insert into the video stream one or more protection elements that serve to authenticate the information being outputted in the video stream; and transmit the generated video stream to the user device.

Yet in one exemplary aspect, a non-transitory computer-readable medium storing computer executable instructions for trusted presentation of information on an untrusted user device comprises instructions for: connecting a secure portable device to the untrusted user device; receiving, by the secure portable device, data from the untrusted user device; analyzing, by the secure portable device, the received data to identify therein information intended for display to the user via the untrusted user device; generating, by the secure portable device, a video stream containing at least part of the information intended for display to the user; generating and inserting into the video stream one or more protection elements that serve to authenticate the information being outputted in the video stream; and transmitting the generated video stream by the untrusted user device to the user device.

The above simplified summary of example aspects of the invention serves to provide a basic understanding of the invention. This summary is not an extensive overview of all contemplated aspects, and is intended to neither identify key or critical elements of all aspects nor delineate the scope of any or all aspects of the invention. To the accomplishment of the foregoing, the one or more aspects of the invention include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects on the invention are described herein in the context of a system, method and computer program product for trusted presentation of information on untrusted user devices. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The following terms will be used in describing example aspect of the invention:

Legally significant actions may include actions which may cause certain legal consequences, for example, signing of an electronic document by means of an electronic key, a confirmation of actions with banking sites, performing a banking transaction and others.

A video stream may include a temporal sequence of frames of a particular format, encoded in a bit stream (a temporal sequence of bits).

Figure 1:
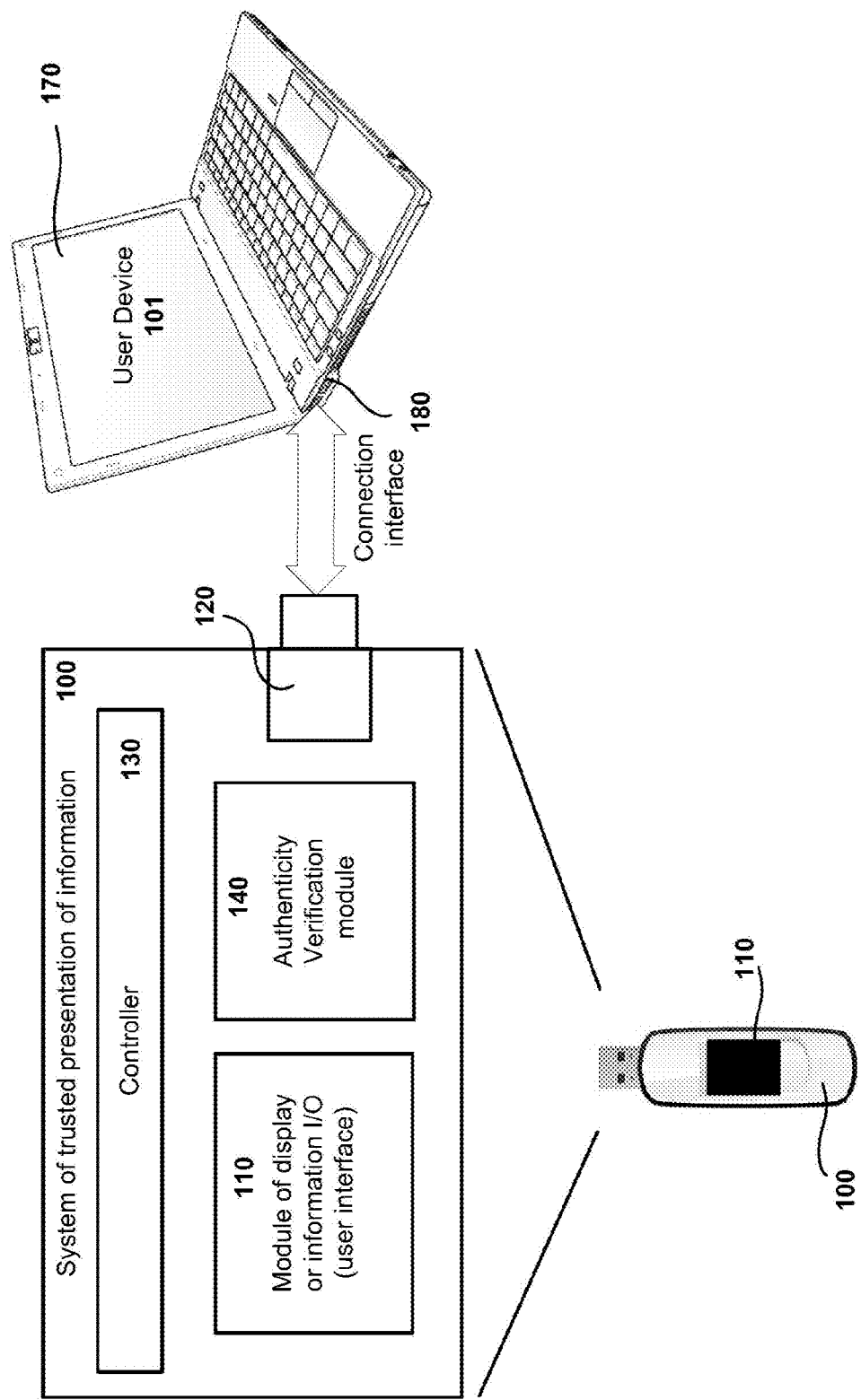
FIG. 1 illustrates an exemplary system for trusted presentation of information on untrusted user device according to one aspect of the invention.

FIG. 1 illustrates an exemplary system for trusted presentation of information on untrusted user device according to one aspect of the invention. The system of trusted presentation of information 100 facilitates display of authentic information on the screen of an untrusted user device 101 (e.g., a personal computer) in real time. In one exemplary aspect, the system 100 may be realized as a portable computing device ("PCD") having the form of a flash drive (but not limited to this) containing interface for display and/or input/output of information 110 (hereinafter, user interface 110) and connected to a personal computer (hereinafter, PC), for example via a USB connection interface 120, or other connection means, such as Ethernet, HDMI and SPI (not shown in FIG. 1). The system 100 allows the user to make sure that the information being displayed on the PC screen is genuine. For this, the system 100 creates a video stream, which is outputted (transmitted) to the PC screen. The video stream contains at least part of the information (such as a document of the user) intended for the user and whose authenticity needs to be confirmed, and at least one protection element, wherein depending on the realization of the PCD at least one protection element, several elements incorporated into the video stream, or the entire video stream will be correlated or synchronized (placed in a relation) with the information being outputted or entered (inputted) on the user interface 110. Thus, for example, if the PCD only allows for information to be outputted on the user interface 110, then the system 100 will provide for a synchronization of the video stream with the information being outputted on the user interface 110. For example, the user interface 110 begins to display a picture (e.g., a cross), and at the same time the same picture (a cross) will be displayed in the video stream on top of the images already displayed at that time. If the picture changes on the user interface 110, the video stream will also change, but the information intended for the user (for example, from the document) will be permanent. Otherwise, if the PCD allows for entering information on the user interface 110 or entering and outputting of information, the system 100 will provide realtime correlation. For example, if the user performs some actions on the user interface 110, the video stream (i.e., the displayed information in the video stream) will respond accordingly. For example, the if the user runs a finger across the user interface 110 up (e.g., when the user interface 110 is a touchpad), then fireworks may appeared on the video stream, over the displayed information of the document. Thus, the synchronization and correlation mean forming of a relation between the user interface and the video stream being transmitted, or a portion thereof (for example, with protection elements) in an appropriate manner.

In one exemplary aspect, the protection element may be designed so that the user can precisely determine the authenticity of the information being outputted in the video stream, and the protection element can be parts of the video stream such as the background, watermarks imposed on the information being displayed, the existence of various animation on the PC screen in the video stream being transmitted, parts of the information being outputted (such as change of font and position of words or letters), and so on. The protection elements are not known in advance of the transmission of the video stream, i.e., they can be formed and selected in random fashion. Thus, the video stream will be exceedingly complex, and therefore impossible for the hacker to distort, on account of the difficulty of replacing the unknown data in the transmitted video stream in real time, which will allow the information being outputted on the screen 170 of the PC 101 to be authentic. Furthermore, the information or protection elements may change in the course of the transmission of the video stream. For example, the protection elements in the transmitted video stream will be changed on the screen of the PC with a certain periodicity (for example, the background changes color, a watermark its shape and size). In another example, protection elements such as watermarks can replace each other depending on the information being entered on the user interface 110.

In one exemplary aspect, the PCD 100 includes one or more connection modules 120 which connects to the corresponding input/output port 180 of the user device 101. The connection module 120 may be implemented as a wired interface, such as a USB, eSATA or FireWire, or as a wireless interfaces, such as Bluetooth or WiFi. The connection module 120 can also be in the form of an Ethernet socket. In one exemplary aspect, the connection modules 120 may include a cellular card or Wi-Fi card that enables PCD 100 to connect to the Internet. It should be noted that a USB connection interface 120 may include as a USB video class (UVC), and thus the system 100 when connected to the PC 101 will be recognized by the PC 101 as being a USB camera (web camera). The UVC class is supported by the majority of present-day operating systems (such as Windows OS and Mac OS) on the most diverse devices, such as desktop computers, notebooks, tablets, mobile telephones, and so on.

In one exemplary aspect, the connection module 120 is connected to a controller 130, which is designed for the interaction (e.g., the transmittal of data) between all the elements of the PCD 100. The controller 130 is coupled (connected) to the user interface 110, which depending on the implementation of PCT 100 may be either an information display module, or an information input/output module. The tasks performed by the two modules will be examined in detail in the description of FIG. 2A and FIG. 2B. In the general case, the user interface 110 can be realized, for example, as a sensory panel (touchpad) for interaction of the user with the system 100. An example of the interaction is actions in the form of touching and/or drawing the finger across the sensory panel, to which the system 100 will respond in the form of making changes to the video stream. In one exemplary aspect, the changes being made involve only the protection elements. Thus, changes can be made according to a previously created template (for example, the appearance of the background gradient of the video stream), or they can be spontaneous (for example, the appearance of an additional protection element in the form of a "fireworks" animation or a phrase in the foreground of the document contained in the video stream being transmitted). At the same time, the changes may be related to (dependent upon) the information being received from the user interface 110 (for example, the actions being performed on the touchpad screen). Besides a touchpad, the interface 110 can also be realized in the form of a trackball or a touchscreen, while the touchscreen can be either monochromatic or colored.

In another exemplary aspect, the user interface 110 can be a display that depicts the information. In this case, the user interface 100 depicts information which repeats the protection elements being displayed in the video stream outputted on the PC screen. For example, the protection elements could be watermarks. Then, the same watermarks, as those being transmitted to the PC, will be depicted on the user interface 100. But if the watermarks from the video stream being transmitted to the PC have certain dynamics of change, for example, one watermark replaces another with a certain periodicity, then the watermarks on the display will also replace one another at the moment of the change on the PC screen.

In another exemplary aspect, the user interface 110 constitutes a set of light bulbs, a set of light-emitting diodes, or at least one light-emitting diode, which will produce an indication correlating (connected) with the video stream being transmitted, i.e., with the image in the video stream. In this case, the user interface 110 will display information correlated to the protection elements being outputted by the video stream on the screen 170 of the PC 101. The information in this case is blinking of the light-emitting diodes. Thus, for example, the set of light-emitting diodes during the transmission of the video stream on the PC screen may perform at least one of the following actions: change color, flash with varying frequency or flash repeatedly in the case of several light-emitting diodes. In another exemplary aspect, a synchronization (correlation) will occur between the emission of the light-emitting diodes and the protection elements being displayed, which are presented for example as a background on the PC screen. For example, upon change in color of the background in the video stream being transmitted, the color of the light-emitting diode will also change. In yet another exemplary aspect, the user interface 110 together with at least one light-emitting diode can contain control knobs, which can be manipulated to produce changes in the information being displayed on the PC screen and the light-emitting diode. Such changes which will occur in the video stream and on the user interface 110 could be automatically formulated by the system 100 itself before displaying the information on the PC by means of the video stream transmission.

In another exemplary aspect, the user interface 110 can also use sound signals for the presentation of the information to the user, making it possible for the user to evaluate such events as for example the beginning and end of the video transmission to the PC screen or sound changes in dependence on the video stream being transmitted. A sound accompaniment will also allow vision-impaired users to make sure of the correlation of the images.

It should be noted that all of the aforementioned example implementations of the user interface 110 in the realization of the system 100 can be used either individually or jointly. Furthermore, the system 100 need not be limited to the presented examples.

In one exemplary aspect, the system 100 includes an authenticity verification module 140, which interacts with the user interface 110 and with the PC 101. The interaction with the PC 101 is done via the connection interface 120. The authenticity verification module 140 is designed to form a video stream which will be transmitted to the PC 101 with the aid of any application installed on the PC 101 and having the ability to display images on the screen of PC 101. Examples of such applications are Media Player Classic Home Cinema, Daum PotPlayer Windows Movie Maker and Microsoft Silverlight, as well as an application created specifically for interaction with system 100 and enabling a transmission of a video stream. The video stream will be formed such that, during the transmission thereof to the PC 101, it will be coordinated (connected) with the information being outputted or entered (inputted) on the user interface 110. The video stream includes the information needed by the user (for example, documents in electronic form or data during a banking transaction) and protection elements corresponding to the required type of protection for the corresponding kind of information. The type of protection indicates which protection element is required as protection in the video stream. Then, the video stream is formed. After this, the video stream is transmitted to the PC together with the information represented or received on the user interface 110. Thus, depending on the implementation, the user can view in real time the correspondence between the information being outputted on the user interface 110 and the output of the video stream containing an information message, or the correspondence between his own actions (manipulations done by him with the input device) and what is being displayed on the PC screen together with the information message. The configuration of the authenticity verification module 140 and the purpose of each element will be discussed below with reference to FIG. 2A and FIG. 2B.

In one exemplary aspect, the system 100 may contain a power supply module (not shown in FIG. 1) to enable ti work autonomously for a certain length of time. An example of a power supply module is a storage battery (such as a lithium ion battery) or a supercapacitor (an energy storing capacitor). The need for a power supply module may occur in a case when the connection and the further interaction with the PC is done wirelessly. At the same time, when system 100 is connected to the PC 101 via a wired interface, e.g., USB connector, the system 100 will obtains the power needed for its working from the PC 101.

Figure 2A:
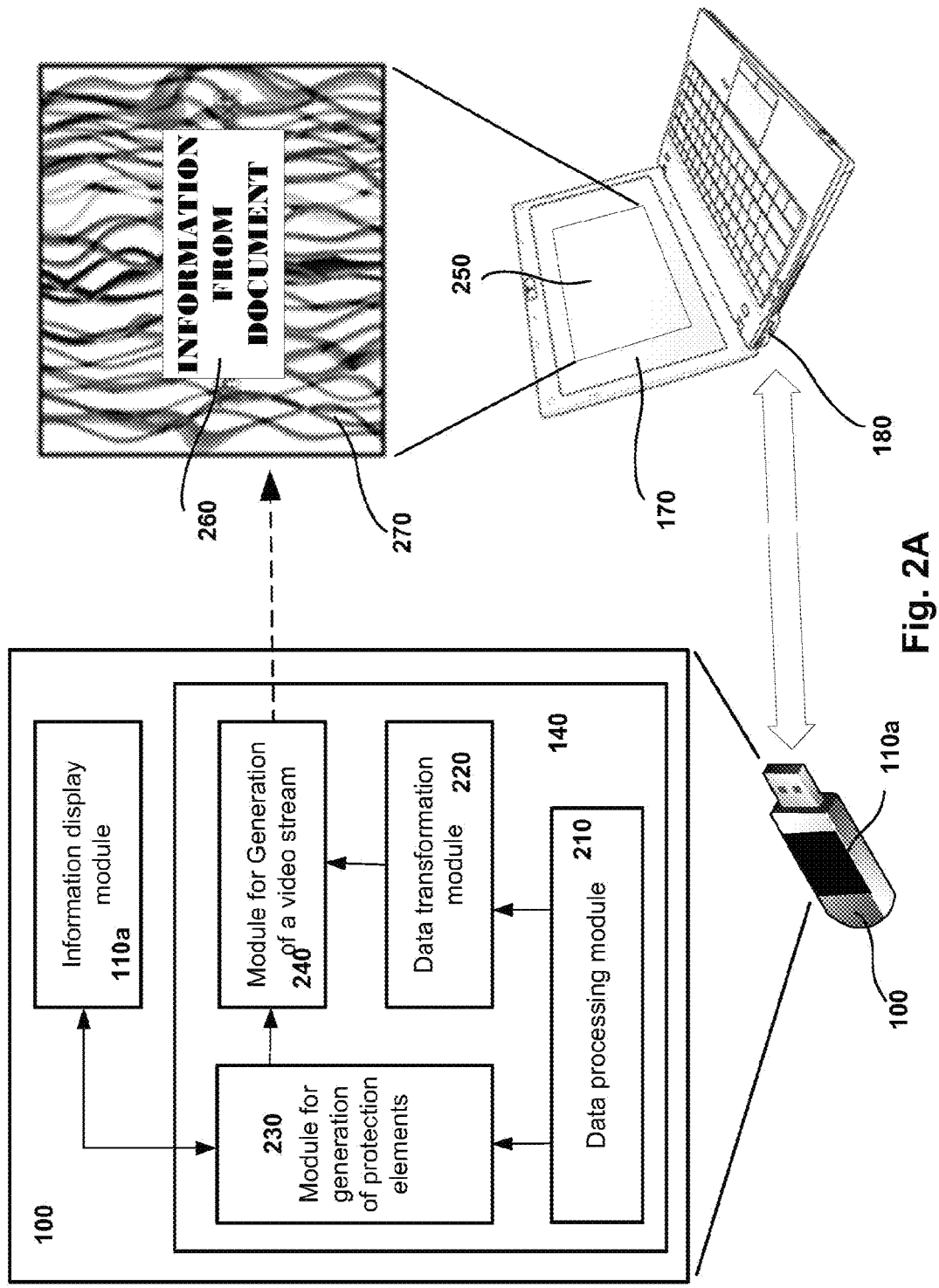
FIG. 2A illustrates an exemplary process of operation of the system for trusted presentation of information on untrusted user device according to one aspect of the invention.

FIG. 2a illustrates an exemplary process of operation of the system 100 for trusted presentation of information on untrusted user device 101, which allows ensure authenticity of the display of authentic information on the screen of the user device 101 by synchronizing the information being displayed on the user device 101 and the user interface 110 of PCD 100, which in the present example will be implemented as an information display module 110a.

The information display module 110a (hereinafter, module 110a) is designed for the visual presentation of information on the PCD 100 that is provided by a module for generation of protection elements 230. In one exemplary aspect, the module 110a is a component which provides information either in the form of an image (an indication) on the screen (such as an information panel/display, as mentioned earlier), or in the form of a colored light (for example, with the aid of at least one light-emitting diode). Examples of the information being presented on a panel/display are either a dynamically changing image, illustrating at least one protection element which is likewise being displayed in the video stream on the PC screen, or a dynamic indication of a background (for example, change of color). Examples of the information being presented via the light-emitting diodes is a dynamic indication of the light in the form of a color change or a flashing of several light-emitting diodes in order.

As shown in FIG. 2, in this exemplary aspect, the system 100 further includes, besides the information display module 110a, also the authenticity verification module 140, which in turn contains a data processing module 210, a data transformation module 220, a module for generation of protection elements 230 and a module for generation of a video stream 240. The authenticity verification module 140 interacts with the information display module 110a through the module for generation of protection elements 230.

The data processing module 210 receives data from the untrusted PC of the user and performs an analysis thereof, during which it determines (isolates) a message contained in the data received. As an example of the data received, one can mention any file containing information (text message) for the user, or data corresponding to a banking transaction. It should be noted that in the context of the present invention, an untrusted PC is a device which the user cannot trust fully, for example, on account of the following reasons: the PC has access to a local area or a wide area network; the PC has the ability to connect to external devices.

Hence, the module 210 during the analysis of the received data will perform the following actions, the first two of which are optional: (1) It determines whether the data is encrypted. If so, it performs a decryption. (2) It determines the authenticity of the data received by checking the integrity of the mentioned data. In this case, if the authenticity of the data is confirmed, it moves on to the next step. Otherwise, if the authenticity is not confirmed, it notifies the user that the data is not correct. (3) It determines the message contained in the data received, and its parameters. (4) It determines information uniquely identifying the mentioned message, i.e., information intended to be displayed to the user.

In one exemplary aspect, the parameters of a message includes elements which uniquely allow an identification of such a message (such as the type, format, extension, type of message encryption) and/or actions which need to be performed (e.g., performing the confirmation of a document or a transaction) after confirming the authenticity of the message.

In one exemplary aspect, messages can be divided into at least two types: a text document regardless of the file format, and a banking transaction. A text document may be a file containing text, such as files with the extension: txt, doc, xls and the like. A banking transaction generally includes any operation with a bank account, which can be initiated for example by means of an electronic instruction via Internet banking systems or other communication systems, and also via a particular payment device.

Next, depending on the kind of message, the module 210 determines the information (identifying the message itself or a portion thereof) which needs to be added thereafter to the video stream being transmitted to the PC screen. Thus, for example, in the case when a banking transaction is determined, the module 210 will perform an analysis of the information contained in the data received, on the basis of which it isolates all elements of the message containing information about the transaction. For example, the number of the account or credit card of the payer, the owner, the place of the transfer, the number of the card of the recipient, the sum, the amount of the commission for the transaction, and so on. In the case when a text document is determined in the received data, the module 210 during the aforementioned analysis determines the source of the information (i.e., who created the document) contained in the received data, and on the basis of the source it determines the volume (part) of the information which will need to be displayed in the video stream. For example, if the user himself has created the document and has proceeded to the signature stage by means of a digital signature, the module 210 will receive data at the moment of the signing of the aforementioned document and, accordingly, will isolate the part of the aforementioned document for display in the video stream, wherein part of the document may contain the first and last page. After this, the module 210 sends the information so determined, i.e., the information which needs to be displayed in the video stream, together with the kind of message to the data transformation module 220, and also sends to the module for generation of protection elements 230 the information about the type of message and the possible actions which will be performed afterwards on the basis of the information being displayed, such as an authentication of the banking transaction or a signing of the document by means of a digital signature. In yet another exemplary aspect, the module 210 sends to the module 230 only the task containing information on the need to form protection elements, with no specific information on the kind of message and the possible actions.

In one exemplary aspect, the data transformation module 220 generates an information message 260 for the user, which contains the information received from the module 210. This process consists in transforming the message into the required form, i.e., a form which can be used in the generation of the video stream (frame). After this, the module 220 transmits the message 260 to the module for generation of a video stream 240.

In one exemplary aspect, the module for generation of the protection elements 230 determines the protection elements 270 in dependence on the information received from the module 210, wherein the module 230 takes account of the capabilities of the information display module 110a. In one exemplary aspect, depending on the implementation of the module 110a, the module 230 contains a database (not shown in FIG. 2a) of possible variants for the generation of protection elements and their applications. Each generation variant contains at least one protection element 270 and rules for the displaying of the protection elements in the module 110a and in the video stream. In yet another exemplary aspect, the module 230 forms the protection elements in random fashion.

Thus, the protection elements 270 may constitute elements of watermarks, a background gradient of the video stream, a flickering in the video stream or of the light-emitting diodes, the appearance of an image or text information during the transmission of the video stream in different parts of the video stream (both before the information message and after it), a color change in the video stream, and so on. The protection elements 270 are intended for both the video stream and for the module 110a, and they can either differ from each other or be entirely the same, but in either case the protection elements will be synchronized (correlated) with each other. For example, the identical protection element will be displayed in the video stream on the PC screen and in the module 110a. Moreover, when outputting the protection elements by the modules 110a and 240, they will also have the ability to change dynamically, where the dynamics of the change in the protection elements will depend on the variant of the protection element being used by the module 230. Such an approach presents the greatest difficulty to the intercepting and distorting of the information.

Next, the module 230 selects a variant of protection of the display (information) in dependence on the kind of message and the capabilities of the module 110a. After this, it sends the corresponding information containing at least one protection element 270 to the module 110a, which carries out the subsequent outputting of the corresponding image (protection element), and to the module for generation of a video stream 240.

In one exemplary aspect, the module for generation of a video stream 240 forms a video stream in which the obtained protection elements 270 and the information message 260 received from the module 220 are present. The generation of the video stream is based on the generation of each frame, which are then transmitted, for example, with a frequency of not less than 24 frames a second. It should be noted that the frame frequency can also be less than 24 frames a second and will depend on the technical capabilities of the components of the system 100. It is also possible for the frame cleanliness to be chosen in each instance in an individual order. Thus, for example, when forming the video stream the module 240 forms several frames layer by layer, where one frame will contain the message, another the protection elements, and so forth. The overlapping algorithms may be different, for example, bitwise offsetting or more complex. The module 240 then sends the video stream to the PC via the I/O port 180 to the corresponding application 250 having the ability to transmit the video stream. The application 250 will transmit the video stream on the screen 170 of the PC in which the information message 260 is displayed that contains at least a portion of the data obtained by the module 210 from the PC, and the protection elements 270. Examples of the application 250 were provided above, and include, for example, Media Player Classic Home Cinema. Together with the start of the transmission of the video stream on the screen 170 of the PC, the module 110a begins to display the corresponding protection elements received from the module 230, the protection elements being displayed synchronously on the screen 170 of the PC and on the module 110a. In one exemplary aspect, the protection elements 270 being displayed in the module 110a and in the video stream being transmitted to the PC screen will be identical to each other, and they will be periodically changed synchronously.

Thus, the user is assured of the authenticity of the information being displayed in real time, i.e., in the data which requires full reliability.

It should be noted that such an approach provides protection against substitution of the information message, since in order to substitute such a video stream one must perform a processing of the video stream in real time, remove the original message in each frame and replace it with another one such that the user does not notice this substitution. Such a task (substitution in real time) is nearly impossible, as it requires substantial computing resources which in all likelihood the user's device (a computer) does not possess. Especially in case when the protection elements are dynamically changing.

Let's consider two examples of operation of the system 100 in which user interface moduel 110 is implemented as an information display element module 110a.

Example 1

Let's suppose that data has been received on the PC of the user in encrypted form, containing a message/document requiring confirmation by the user. In this case, the PC will send the encrypted data packet to the module 140, specifically to the module 210, which performs the decryption of the data, verifies the authenticity of the message and its integrity, determines the kind of message and sends to the modules 220 and 230 the information needed by them (as described previously). For example, the module 220 has fully received the entire message contained in the data received, and the module 230 has received information as to the kind of said message. The module 220 transforms the information received into an information message 260 and sends it to the module 240. The module 230 selects the necessary protection variant according to the information received and forms the protection elements 270 that will be sufficient to protect the given information. After this, the module 230 sends an instruction containing the protection elements 270 to the modules 110a (the module is realized in the form of a display) and 240. The module 240 forms a video stream containing the information message 260 and the protection elements 270. Then the video stream is sent to the PC in the application 250. After this, the application 250 begins to transmit the received video stream, which is synchronized with the image on the module 110a. In this example, the protection elements being displayed by the module 110a and the video stream in the application 250 are identical to each other and/or correlated with respect to each other such that a synchronous changing of the protection elements occurs. Consequently, the user sees the information message which is protected by the protection elements coordinated with the protection elements on the external device, ensuring the authenticity of the message. After this, the user can read the message and endorse the document received.

Example 2

Let's suppose that the user's PC has received a request in the form of a banking transaction requiring the user's authentication. In this case, the PC likewise sends data to the module 140. The module 140 with the help of the previously mentioned modules performs a series of actions, after which it performs the transmission in a video stream of a message 260 containing important information about the transaction. After the user has looked through the information provided and made sure that the information is genuine, the transaction can be authorized, for example, with the help of the information display module 110, (an example of this will be described in FIG. 2B). After this, the system 100 forms a reply to the request, signing the reply with the help of its secret key or certificate and sends back the reply via the PC.

Figure 2B:
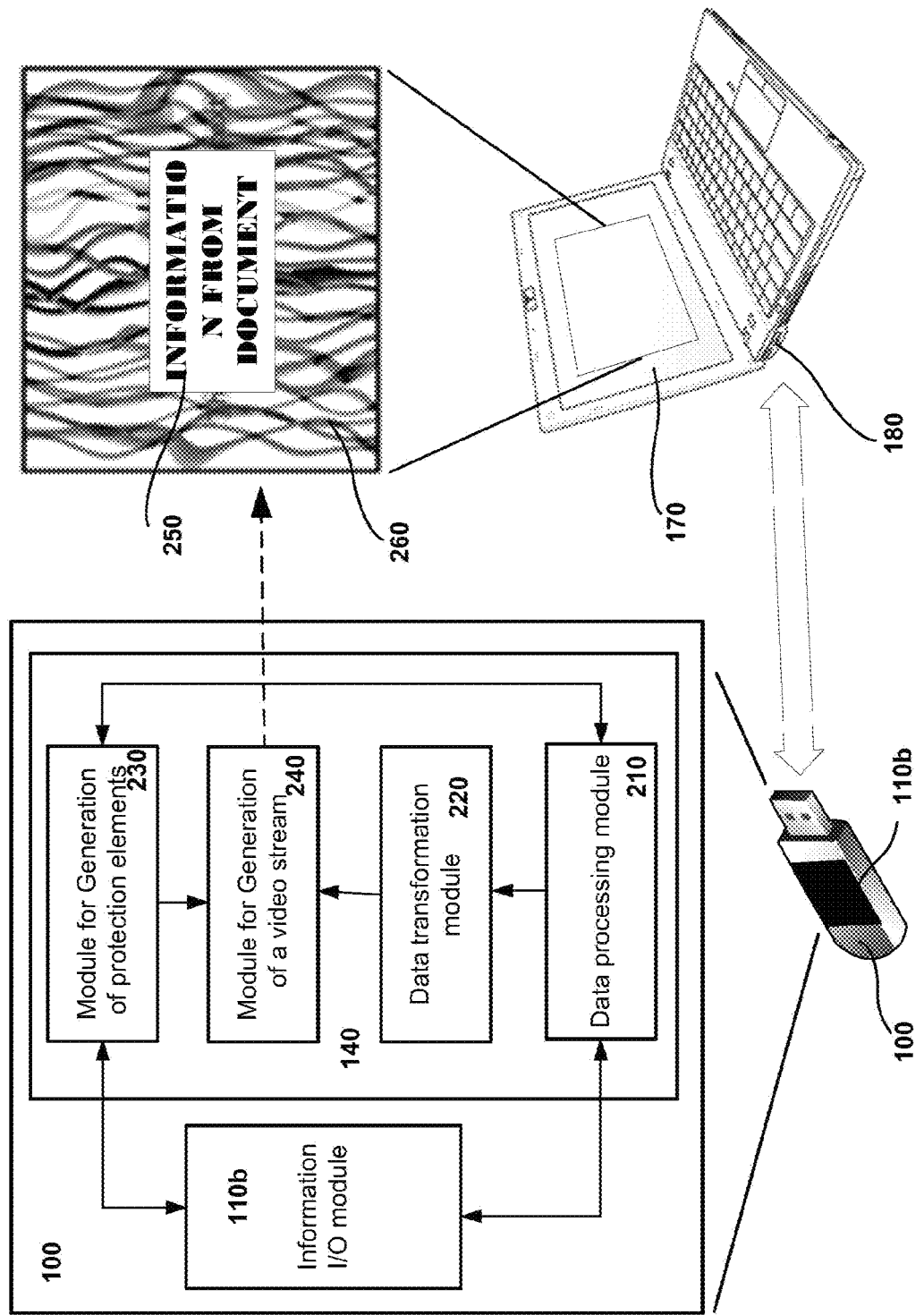
FIG. 2B illustrates another exemplary process of operation of the system for trusted presentation of information on untrusted user device according to one aspect of the invention.

FIG. 2B illustrates another exemplary process of operation of the system 100 for trusted presentation of information on untrusted user device 101 by correlation of the information being displayed on the PC and the actions of the user received by the user interface 110 which in this example may be implemented as an information I/O module 110b. It must be noted that the purpose and the interaction of the modules 210, 220, and 240 are analogous to their implementations described above with reference to FIG. 2a. The principal differences in this implementation from the one describe above with reference to FIG. 2a are the purpose and the interaction of the module 230 and the information I/O module 110b.

The information I/O module 110b is designed both for visual presentation of information on the DPU and for the determination of the actions being performed by the user with the module 110b, which it will then send to the module for generation of protection elements 230. In one exemplary aspect, the module 110b is a component which has the ability to both outputted information and determine (monitor) manipulations with it, for example, such a component can be realized with the help of a sensory panel (touchpad) and a sensory screen (touchscreen). The mechanism of presenting information by the module 110b is analogous to the module 110a. The mechanism of determination (monitoring) of manipulations of the user is produced with the aid of approaches known in the art, in which data gathered during manipulation with the module 110b is sent to the module 230.

The module 230, as previously stated, is designed to form the protection elements 270, wherein the indicated data (information) obtained from the module 110b is used during the generation of the necessary protection elements 270. The generation of the protection elements is done by means of rules containing information on the correspondence of the data being entered on the module 110b and the generation of the necessary protection elements 270 to protect the information message in the video stream. An example of one such rule is the following condition: for a horizontal swipe across the sensory screen, the protection element is formed as a color change of the background in the video stream. Another example of a rule is the condition that, with constant contact (prolonged contact) of the user with the sensory screen, the protection element in the video stream will be in the form of an animation (moving image of an image or watermark) on top of the information message. Likewise, in one exemplary aspect, the module 230 begins to perform its functions only after receiving information (a task, a demand) from the module 210, and said information received can also be factored into the rules for the generation of protection elements. After the generation of the protection elements, the module 230 sends them to the module for generation of a video stream 240. The protection elements themselves can be generated in random fashion.

The module 240 (as was described above) forms the video stream, and the video stream contains the received protection elements 270 and the information message 260 received from the module 220, and it sends the video stream back to the PC via the I/O port 180 to the corresponding application 250. The application 250 performs the transmission of the received video stream on the screen 170 of the PC. It should be noted that during the transmission of the video stream, which occurs in real time, the protection elements being displayed will change according to the rules of the module 230, in a way that will ensure a correlation/synchronization of the transmitted image on the screen 170 of the PC and the data collected on the basis of the user's manipulations with the module 110b. In other words, depending on the data determined (monitored) from the actions performed by the user on the module 110b in the video stream being transmitted, changes will occur in the protection elements, and the changes may involve either the protection elements themselves (i.e., one after another) or the protection element being displayed directly in the transmitted video stream (for example, the position with respect to the information being displayed or the color of the protection element).

In yet another exemplary aspect, when the module 110b can also display information, the module 230 after the generation of the protection elements on the basis of the data received from the module 110b will send a corresponding instruction, containing the formed protection elements 270, to the module 110b, which will perform the subsequent outputting of the corresponding image. Accordingly, in such an aspect, the module 110b will be both a data entry element and an information output element, and during the outputting of the information, as with the module 110a, there will be a synchronization of the image of the video stream being transmitted on the screen 170 of the PC and on the module 110b.

If module 110b functions only as an input device, then the interaction of the module 110b and the module 230 will consist solely in receiving data.

Let's consider one possible implementation in which the module 110 is realized as the module 110b, i.e., an information I/O element. We shall suppose that a user with the aid of a PC prepares a document for subsequent transmittal, being signed by the EDS. In this case, the information I/O module 110b likewise has the functions of a keyboard entry (for example, of the sensory type). Thus, during the endorsing of the document using the EDS, data containing the document itself is sent from the PC to the module 140, specifically, to the module 210. The module 210 determines the kind of information message and the actions needing to be performed. After this, the module 210 sends the corresponding information to the modules 220 and 230, while in the given example the document in its entirety will be sent in the form of the information message for the module 220. The module 220 transforms the received message into the necessary form and sends it to the module 240. As for the module 230, this determines the variant of the protection elements. For this, the module 230 asks for/waits for data from the module 110b. The module 110b registers the response (manipulations) of the user and sends them in the form of data to the module 230. The module 230 then forms the protection elements on the basis of the data received. For example, the chosen variant for the protection element is a change in the background when the user touches the module 110b, which is realized in the form of a sensory panel. After this, the module 230 sends the protection elements to the module 240. In turn, the module 240 carries out the generation of the video stream, in which the information message and the protection elements are combined, the combining being done in such a way that the background in the video stream has the ability to change color afterwards. The module 240 then sends the video stream to the PC, where it is displayed by the application 250. It should be noted that, upon receiving the data as to the manipulations of the user by the module 110b, the module 230 then carries out changes in the protection elements according to the rules, which it sends to the module 240. The module 240 in turn transforms the video stream and sends it to the PC.

In one exemplary aspect, the module 110b can also have the function of a scanner, with which the identification of the fingerprint of the user is performed.

Figure 3:
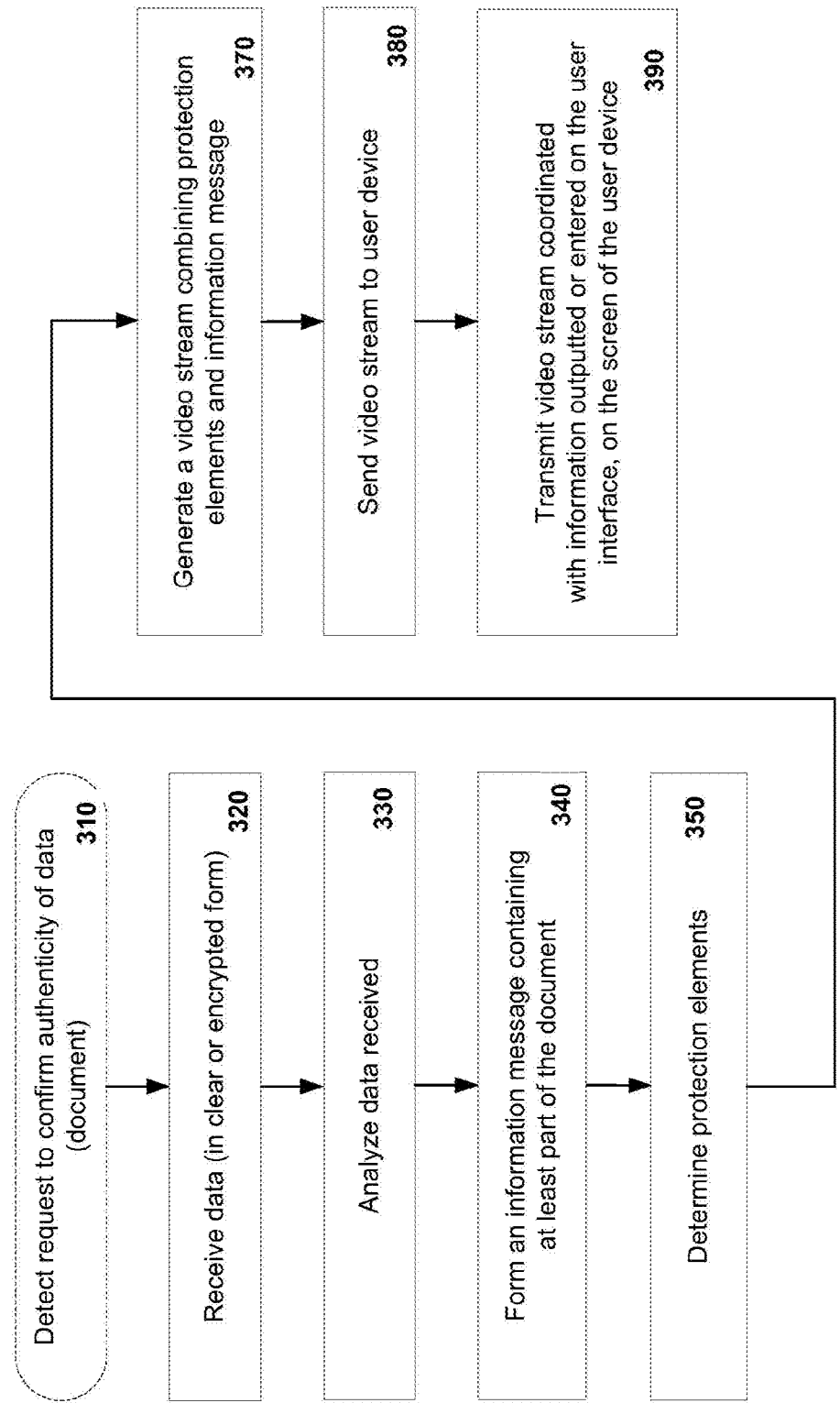
FIG. 3 illustrates an exemplary method for trusted presentation of information on untrusted user device according to one aspect of the invention.

FIG. 3 illustrates an exemplary method for trusted presentation of information on untrusted user device according to one aspect of the invention. In one exemplary aspect, data containing an encrypted electronic document is obtained from the Internet on the PC 101 of a user or other known methods. The user must be assured as to the authenticity of the document at the moment of signing the received electronic document. For this, in step 310, he generates a request for confirmation of the authenticity of the data (the document) in a preparatory stage, while this step is optional for the realization of the invention. During the request, data is transmitted to the system for trusted presentation of information 100.

Thus, in step 320, the system for trusted presentation of information 100 by means of the data processing module 210 obtains the above indicated data from the PC 101 through the I/O port 180. Thus, in one exemplary aspect, the data obtained on the PC of the user has been encrypted, and module 210 also receives the indicated data in encrypted form. In step 330, the module 210 performs an analysis of the data received, during which it determines (isolates) the message contained in the received data, and its parameters. For this, the module 210 decrypts the data (in this case the mechanism of encryption/decryption is contained in the module 210), determines the authenticity of the received data by checking its integrity and determines the message (file) contained directly therein and its parameters. By message parameters is meant those elements which uniquely identify said message (for example, the kind of message), the content of the received data, and the actions needing to be performed (such as confirm the document or transaction) after confirming the authenticity of the message. Messages can be divided into at least two kinds: a text document regardless of the file format, and a banking transaction. By a text document is meant a file which may contain text, such as files with the extensions txt, doc, xls and the like. Then, depending on the kind of message, the module 210 determines the information (identifying the message itself or a portion thereof) which must be added afterwards to the video stream being transmitted on the PC screen.

In step 340, the data transformation module 220 generates an information message 260, which includes information from the module 210 for presentation to the user. The generation consists in transforming the information to the required form, i.e., a form which can be used during the generation of the video stream (frame). In step 350, the protection elements 270 are determined for the information message in dependence on the information obtained from the module 210. For example, as the information from the module 210, information is sent as to the kind of message or an instruction to form protection elements for the information message. It should be noted that the determination of the protection elements takes into account the type of the user interface 110. Different types of user interfaces 110 and possible protection elements have been examined in the description of the system 100 in FIG. 2A and FIG. 2B. Thus, depending on the information, at least one protection element 270 will be selected and used afterwards in forming the video stream. In one exemplary aspect, the protection elements may be chosen randomly. Along with the selection of the protection elements 270, the rule of interaction is also determined, i.e., rules for the use of the protection elements in the video stream, on the user interface 110, and their interaction with each other. For example, the rule will contain information as to the order in which the protection elements in the video stream and in the user interface 110 will be displayed and will interact (for example, simultaneous display, changes or transformation; or reaction of the protection elements in the video stream to actions on the visualization means). The selected protection elements 270 and rules are then sent to the corresponding modules.

In step 370, the module 240 generates a video stream containing the obtained protection elements 270 and information message 260. The mechanism of generation of the video stream was described above with reference to FIG. 2a. After this, in step 380, the video stream is sent to the PC I/O port 180 to the application which will perform the transmission of the video stream. Examples of the application have been given in the description of FIG. 1.

In step 390, the indicated application performs the transmission of the received video stream, in which the information message and the protection elements are displayed. The transmission of the video stream is done such that the information being transmitted and/or the protection elements are coordinated (correlated) with the information being outputted or entered (inputted) on the user interface 110. Depending on the type of the user interface 110, together with the transmission of the video stream on the user interface 110 there will either be displayed protection elements, where the protection elements are similar to the protection elements from the video stream, or the protection elements presented in the video stream will react to the information being received from (determined by) manipulations (actions) on the surface (active elements) of the user interface 110.

Figure 4:
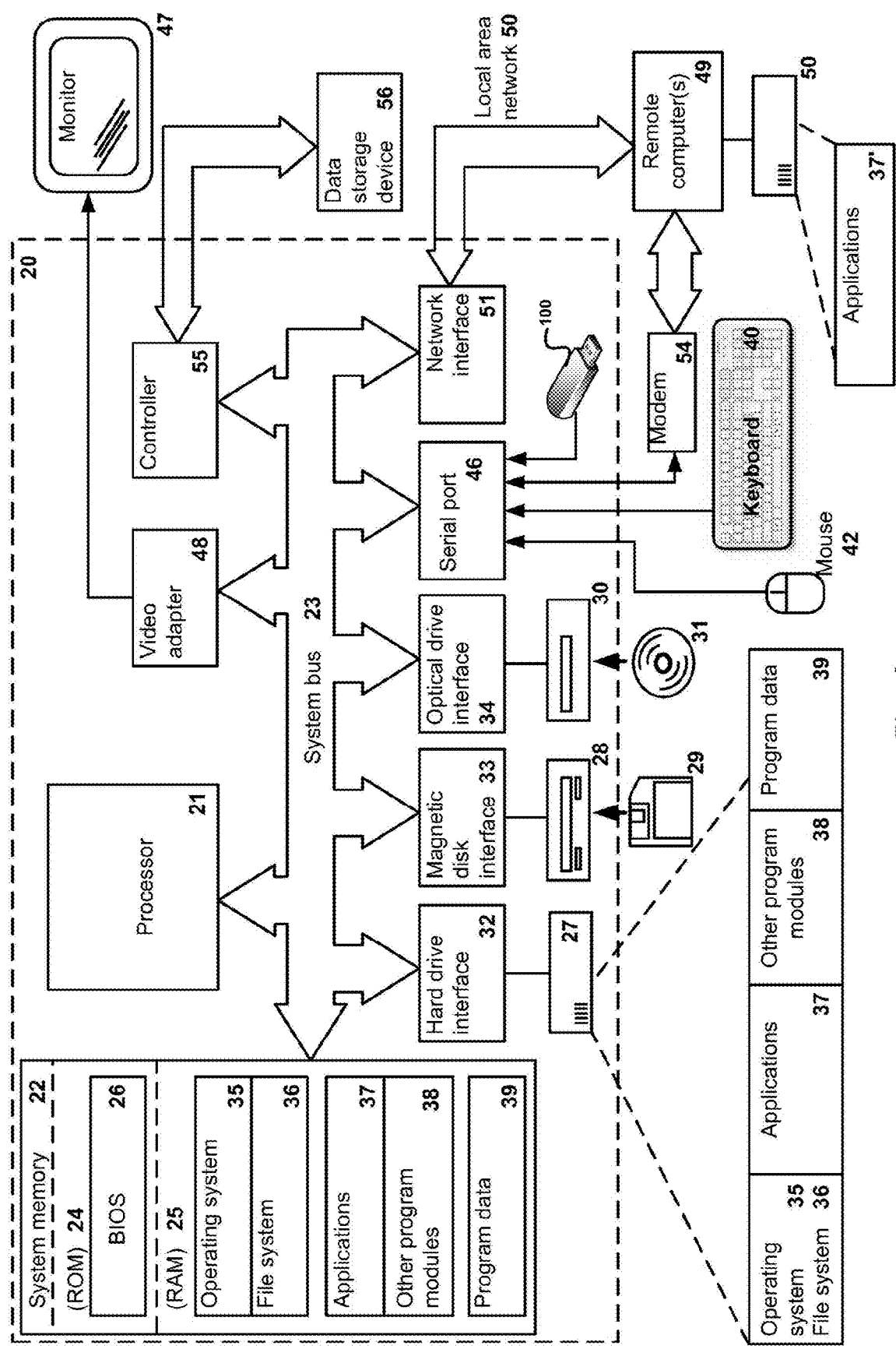
FIG. 4 illustrates an example of a general-purpose computer system on which the aspects of the systems and methods for trusted presentation of information on untrusted user devices can be implemented.

FIG. 4 is a diagram illustrating a general-purpose computer system on which aspects of systems and methods for trusted presentation of information to users of untrusted devices may be implemented in accordance with an exemplary aspect. As shown, the computer system 20 (which may be a personal computer or a server) includes a central processing unit 21, a system memory 22 and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. . . . . . Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIGS. 1-3, supra). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for trusted presentation of information on an untrusted user device, the method comprising:
receiving, by a secure portable device communicatively coupled to the untrusted user device, data from the untrusted user device, wherein the untrusted user device is an intended recipient of the information for display to the user;
analyzing, by the secure portable device, the received data to identify therein information intended for display to the user via the untrusted user device;
generating, by the secure portable device, a video stream containing at least part of the information intended for display to the user;
generating, by the secure portable device, and inserting into the video stream one or more protection elements that serve to authenticate the information being outputted in the video stream; and
transmitting, by the secure portable device, the video stream, with the one or more protection elements inserted therein, to the untrusted user device from which the data was received, wherein the video stream is transmitted for display on a display of the untrusted user device, the one or more protection elements being changeable during the transmission of the video stream, and the protection element including one of: a background, a watermark, an animation, a change of a font of words or letters, and a change of a position of words or letters.

2. The method of claim 1, further comprising:
synchronizing the display of the protection elements on the display of the untrusted user device and on a user interface of the secure portable device, wherein the protection elements on the user interface of the secure portable device change in response to a change in the protection elements inserted into the video stream on the display of the untrusted user device.

3. The method of claim 1, wherein analyzing the received data includes one or more of:
determining whether the data is encrypted and decrypting it;
checking authenticity of the received data;
determining the information contained in the received data and its parameters; and
identifying within the analyzed data information intended to be displayed to the user.

4. The method of claim 1, wherein the protection elements are generated and selected randomly.

5. The method of claim 1, further comprising:
periodically changing the protection elements inserted in the video stream.

6. The method of claim 1, wherein one or more protection elements are generated based on user input received via a user interface of the secure portable device.

7. A system for trusted presentation of information on an untrusted user device, the system comprising:
a secure portable device communicatively coupled to the untrusted user device and having at least one processor configured to:
receive data from the untrusted user device, wherein the untrusted user device is an intended recipient of the information for display to the user;
analyze the received data to identify therein information intended for display to the user via the untrusted user device;
generate a video stream containing at least part of the information intended for display to the user;
generate and insert into the video stream one or more protection elements that serve to authenticate the information being outputted in the video stream; and
transmit the video stream, with the one or more protection elements inserted therein, to the untrusted user device from which the data was received, wherein the video stream is transmitted for display on a display of the untrusted user device, the one or more protection elements being changeable during the transmission of the video stream, and the protection element including one of: a background, a watermark, an animation, a change of a font of words or letters, and a change of a position of words or letters.

8. The system of claim 7, further comprising:
synchronizing the display of the protection elements on the display of the untrusted user device and on a user interface of the secure portable device, wherein the protection elements on the user interface of the secure portable device change in response to a change in the protection elements inserted into the video stream on the display of the untrusted user device.

9. The system of claim 7, wherein analyzing the received data includes one or more of:
   determining whether the data is encrypted and decrypting it;
   checking authenticity of the received data;
   determining the information contained in the received data and its parameters; and
   identifying within the analyzed data information intended to be displayed to the user.

10. The system of claim 7, wherein the protection elements are generated and selected randomly.

11. The system of claim 7, further comprising:
   periodically changing the protection elements inserted in the video stream.

12. The system of claim 7, wherein one or more protection elements are generated based on user input received via a user interface of the secure portable device.

13. A non-transitory computer-readable medium storing computer executable instructions for trusted presentation of information on an untrusted user device, comprising instructions for:
   receiving, by a secure portable device communicatively coupled to the untrusted user device, data from the untrusted user device, wherein the untrusted user device is an intended recipient of the information for display to the user;
   analyzing, by the secure portable device, the received data to identify therein information intended for display to the user via the untrusted user device;
   generating, by the secure portable device, a video stream containing at least part of the information intended for display to the user;
   generating, by the secure portable device, and inserting into the video stream one or more protection elements that serve to authenticate the information being outputted in the video stream; and
   transmitting, by the secure portable device, the video stream, with the one or more protection elements inserted therein, to the untrusted user device from which the data was received, wherein the video stream is transmitted for display on a display of the untrusted user device, the one or more protection elements being changeable during the transmission of the video stream, and the protection element including one of: a background, a watermark, an animation, a change of a font of words or letters, and a change of a position of words or letters.

14. The non-transitory computer-readable medium of claim 13, further comprising instructions for:
   synchronizing the display of the protection elements on the display of the untrusted user device and on a user interface of the secure portable device, wherein the protection elements on the user interface of the secure portable device change in response to a change in the protection elements inserted into the video stream on the display of the untrusted user device.

15. The non-transitory computer-readable medium of claim 13, wherein analyzing the received data includes one or more of:
   determining whether the data is encrypted and decrypting it;
   checking authenticity of the received data;
   determining the information contained in the received data and its parameters; and
   identifying within the analyzed data information intended to be displayed to the user.

16. The non-transitory computer-readable medium of claim 13, wherein the protection elements are generated and selected randomly.

17. The non-transitory computer-readable medium of claim 13, further comprising instructions for:
   periodically changing the protection elements inserted in the video stream.

18. The non-transitory computer-readable medium of claim 13, wherein one or more protection elements are generated based on user input received via a user interface of the secure portable device.

* * * * *